E. H. J. LORENZ.
COMPUTING MECHANISM.
APPLICATION FILED DEC. 26, 1919.
1,372,707.
Patented Mar. 29, 1921.
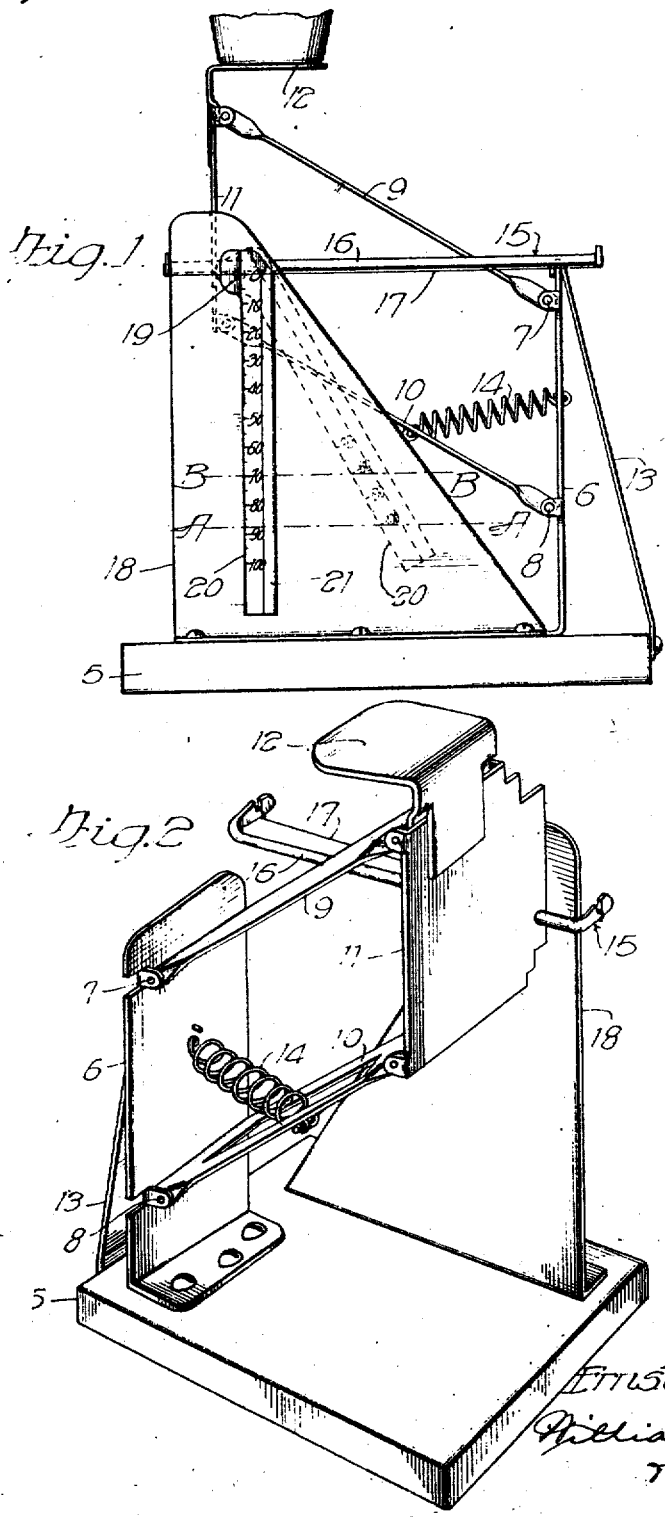

UNITED STATES PATENT OFFICE.

ERNST H. J. LORENZ, OF MADISON, WISCONSIN, ASSIGNOR TO A COPARTNERSHIP CONSISTING OF GEORGE B. HARRIS AND GEORGE D. PUFFER, BOTH OF WAUKESHA, WISCONSIN, AND JAMES L. HARRIS AND JOHN H. HARRIS, BOTH OF ELKHORN, WISCONSIN.

COMPUTING MECHANISM.

1,372,707.

Specification of Letters Patent.  Patented Mar. 29, 1921.

Application filed December 26, 1919.  Serial No. 347,384.

*To all whom it may concern:*

Be it known that I, ERNST H. J. LORENZ, a citizen of the United States, residing at Madison, in the county of Dane and State of Wisconsin, have invented a certain new and useful Improvement in Computing Mechanism, of which the following is a full, clear, concise, and exact description, reference being had to the accompanying drawings, forming a part of this specification.

My invention relates to a computing mechanism for use in connection with the computation of "overrun" or inflation in volume of the frozen "mix" in the commercial manufacture of ice cream. As is well known, the mix, during the process of manufacturing ice cream, oftentimes becomes inflated in volume to such an extent as to render the final product unsalable. It is therefore very important that the actual increase in volume of the mix when frozen shall be determined with accuracy.

The volume fluctuations are usually determined by the following method. A weighing mechanism is used which is so adjusted that when a beaker or hydrometer jar is placed thereon the indicator of the weighing mechanism will cause a zero depression, as indicated on the scale. The jar or beaker is then filled with unfrozen mix until the indicator is depressed to a point exactly opposite the one hundred units point of the scale on the weighing mechanism. A burette is generally utilized to add unfrozen mix drop by drop until exactly the required amount is obtained. At this point the scale division on the hydrometer jar or beaker is recorded. After the batch is frozen the jar or beaker is filled with frozen mix until a one hundred units depression of the scale is again obtained. At this point the scale division on the jar or beaker is again noted. The percentage of increase in volume is, of course, obtained by a comparison of the two volumes which were recorded.

My invention obviates the necessity of weighing out amounts of unfrozen and frozen mixes which will produce exactly one hundred unit depressions of the indicator on the scale. By means of my invention a jar of a given capacity is filled to the brim with unfrozen mix. The depression of the indicator on the scale is then at random given a unit value by a simple manipulation of the scale with which my invention is particularly related. When the batch is frozen the same beaker is filled with frozen mix. The depression as indicated on the scale is then compared with the one hundred units depression directly. Thus the beaker of unfrozen mix is arbitrarily taken as weighing one hundred units; then if the frozen mix, for example, depresses the indicator to eighty units on the scale, $$\frac{100}{80} = 1.25.$$

Therefore the percentage of inflation in this instance is twenty-five per cent.

The old method of computing the percentage of inflation is in itself not exceedingly complicated. However, when it is considered that such computations are repeated hundreds of times, where ice cream is manufactured commercially, it is essential that this work be minimized as much as possible.

In the following detailed description, reference is made to the accompanying drawing, illustrating my invention, wherein—

Figure 1 is a front elevation of the improved computing mechanism of my invention; and Fig. 2 is a view in perspective, illustrating a weighing mechanism which I utilize in connection with my improved computing mechanism.

Throughout the views, similar reference numerals refer to similar parts.

Referring to Figs. 1 and 2, 5 indicates a base upon which is secured, in any suitable manner, as for example by screws, as shown, a vertical upright 6, to which is pivoted at 7 and 8 the arms 9 and 10, respectively. The arms 9 and 10 are pivoted at their free ends to a vertical plate 11 which carries at its upper edge and secured thereupon a horizontally extending platform 12, which is adapted to receive the substances or objects to be weighed. If desired, a brace 13 may be provided for the upright 6. The base 5 is preferably of wood, although any other suitable material may be used while the parts 6, 9, 10, 11, 12 and 13 are preferably of sheet iron or other suitable material. A steel tension spring 14 is secured between the upright 6 and the arm 10. It will appear that the spring 14 must be of such a tension as to produce, when an object is placed upon the platform 12, proportional depressions of the indicator 15. The indicator 15 which is arranged to travel over a scale to be presently described, comprises a horizontal arm 16, which is suitably secured to the plate 11 and is bent at right angles at its free ends to provide means between which a thread or wire 17 may be held in any suitable manner. It will be understood that, while I have illustrated a weighing mechanism employing springs, my invention is equally applicable to springless balances.

A vertical faceplate 18 is secured to the base 5 by screws as shown. Pivoted to the plate 18 at its upper end at the point 19 is a scale 20 held in a suitable holder 21.

In the drawing, I have shown the holder 21 as being a sheet metal member bent upon itself at one side thereof, to form a means to retain the paper strip or scale 20 provided with the required indicia.

The scale 20 is so arranged that its zero graduation registers with the thread or wire 17 when there is nothing in the beaker resting on the platform 12.

While I in nowise limit myself to any particular form of scale, I have here illustrated the scale 20 as being graduated from zero to one hundred, the one hundred point corresponding to the greatest possible depression of the indicator.

The operation of the mechanism just described will perhaps be best understood when taken in connection with the following example.

Assume that the sample beaker full of unfrozen mix when placed on the platform 12 depresses the indicator to the point indicated in figure 1 by the dotted line A—A. It will be seen that this line registers approximately with the 87.5 units point of the scale 20. The scale 20 is then grasped and turned in a counter-clockwise direction to the position indicated by dotted lines in Fig. 1, in which position the one hundred unit point of the scale 20 registers with the thread or wire 17 of the indicator, which is represented by the dotted line A—A. When the batch is frozen another sample beaker full is taken. Assume that when placed upon the platform 12 this second sample depresses the indicator to the position indicated by the dotted line B—B in Fig. 1. It will be seen that the line B—B crosses the scale 20 (full line) at the seventy units point. The line B—B also crosses the scale 20 (dotted line) at the point eighty. It will appear that the percentage of inflation in volume is readily derived by simply comparing the two values one hundred and eighty. Thus $$\frac{100}{80} = 1.25.$$

Therefore the percentage of inflation is twenty-five per cent. It will be obvious that the problem can thus be easily and quickly solved without going through the laborious procedure of obtaining the volume of either frozen or unfrozen mixes, which will depress the indicator on the scale exactly to the one hundred units point.

It will appear that while I have described a scale in which the graduations run from zero to one hundred, the specific form of scale used in connection with my improved mechanism is immaterial, and it might be found advantageous in some instances to utilize a scale in which the increases in volume of the substance may be determined directly.

Having thus described my invention, what I claim as new and desire to secure by Letters Patent of the United States is:

1. A computing mechanism comprising a weighing mechanism having a horizontally disposed indicator movable downwardly in proportion to the weight of the object weighed, and a scaled member pivoted at its upper end and coöperating with said indicator, whereby by changing the inclination of the member the significance of the indications on the scale thereof may be varied.

2. A computing mechanism comprising a weighing mechanism having a rectilinear indicator movable in a constant direction in proportion to the weight of the object weighed, and extending at right angles to the direction of its movement, and a scale member pivoted at its end registering with the zero point of the indicator and coöperating with said indicator, whereby by changing the position of the indicator, the significance of the indications on the scale thereof may be varied.

3. Means for computing the overrun in ice cream and other frozen substances comprising, a weighing mechanism having a movable indicator extending at right angles to its direction of movement, and a graduated member along which said indicator is adapted to travel, the said member being pivoted at a point registering with its zero graduation, whereby it may be turned so that a given graduation on said member can be brought into registry with said indicator in any position which the indicator may assume upon deflection thereof.

In witness whereof, I hereunto subscribe my name this 19th day of December, 1919.

ERNST H. J. LORENZ.